No. 761,545. PATENTED MAY 31, 1904.
W. P. RUTH & W. H. JONES.
BELT GUIDE AND SHIFTER.
APPLICATION FILED NOV. 2, 1903.
NO MODEL.
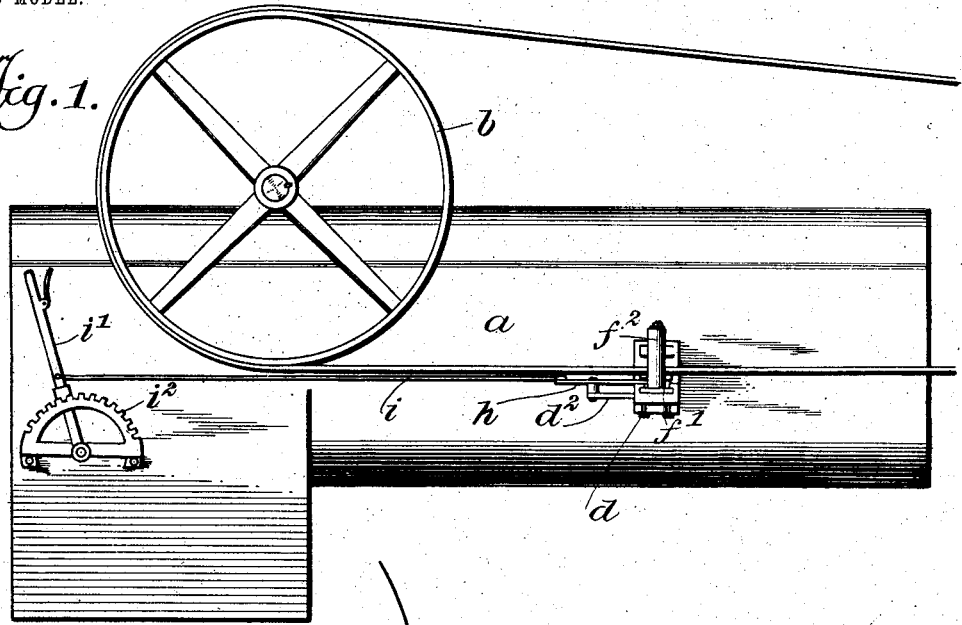
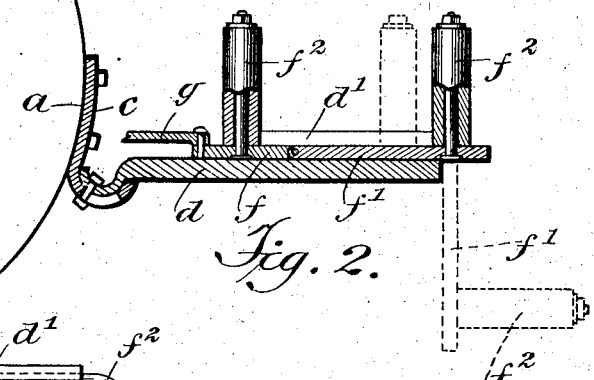
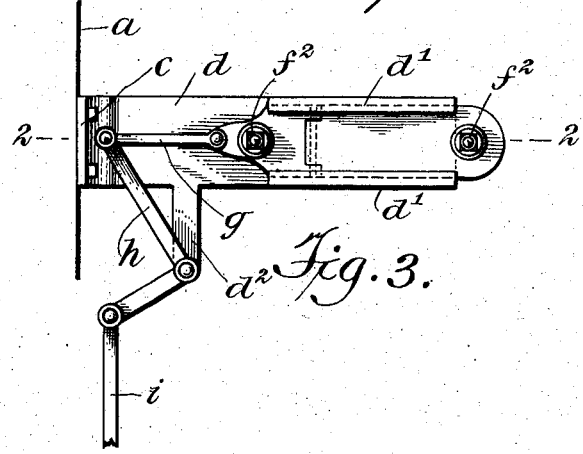
WITNESSES:
A. R. Appleman
Isaac B. Owens.
INVENTORS
William P. Ruth
Wilson H. Jones
BY
ATTORNEYS No. 761,545. Patented May 31, 1904.

UNITED STATES PATENT OFFICE.

WILLIAM P. RUTH AND WILSON H. JONES, OF DOWNS, KANSAS.

BELT GUIDE AND SHIFTER.

SPECIFICATION forming part of Letters Patent No. 761,545, dated May 31, 1904.

Application filed November 2, 1903. Serial No. 179,426. (No model.)

*To all whom it may concern:*

Be it known that we, WILLIAM P. RUTH and WILSON H. JONES, citizens of the United States, and residents of Downs, in the county of Osborne and State of Kansas, have invented certain new and useful Improvements in Guides and Shifters, of which the following is a full, clear, and exact description.

Our invention relates to a belt holder and shifter designed especially for use in traction and other agricultural engines, but capable of use in other connections. By means of our invention the belt may be held true on the pulley during the operation of the engine, and, if desired, the shifter may be operated to throw the belt off of the pulley instantly and at any time during the operation of the apparatus.

This specification is a specific description of one form of the invention, while the claims define the precise scope of the invention.

Reference is to be had to the accompanying drawings, forming a part of this specification, in which similar characters of reference indicate corresponding parts in all the figures.

Figure 1 is a side elevation of the invention in use. Fig. 2 is a section on the line 2 2 of Fig. 3, and Fig. 3 is a plan view of the invention.

In the drawings, $a$ indicates the traction or agricultural engine boiler, and $b$ the driving-wheel of the engine. A bracket $c$ of any suitable form is fastened securely to the side of the boiler forward of the band-wheel $b$, and to this bracket is adjustably connected the support $d$ on the belt-shifter, said support being held when in operation in horizontal position. The outer portion of the support $d$ is formed with guides $d'$, extending longitudinally of the support and transversely of the engine, and on the support to move in the guides is mounted a slide formed of two parts $f$ and $f'$, hingedly connected together and carrying, respectively, the vertically-disposed rollers $f^2$, between which rollers the belt is adapted to run and by which the belt is guided. To the slide is connected a link $g$, and said link in turn is connected to an elbow $h$, fulcrumed on an extension $d^2$ of the support $d$ and having connection with a rod $i$, which extends rearward to a device $i'$ at the rear end of the engine, by which device the rod $i$ is held adjustably in any position desired.

When the device is used as a belt guide or holder, it is placed in the position shown in Fig. 1 and by full lines in Fig. 2, the lower run of the belt then passing between the rollers $f^2$ and being guided thereby. The slide is held from being shifted by means of the device $i'$, which may be of any sort desired. As shown, such device consists of a hand-lever having a thumb-latch designed to coöperate with a segment-rack $i^2$. When it is desired to shift the belt to throw it from the band-wheel, the rod $i$ is operated to throw the slide out into the position indicated by the broken lines in Fig. 2. The outer part $f'$ of the slide as soon as it passes beyond the support $d$ will drop into the vertical position indicated by broken lines in Fig. 2. The roller $f^2$ of the inner part of the slide will meanwhile have carried the belt laterally and moved it off from the band-pulley, and as the outer part of the slide drops it allows the belt to fall alongside of the engine.

Various changes in the form, proportions, and minor details of our invention may be resorted to without departing from the spirit and scope thereof. Hence we consider ourselves entitled to all such variations as may lie within the scope of the claims.

Having thus described our invention, we claim as new and desire to secure by Letters Patent—

1. The combination of a support, a jointed slide mounted thereon, a guiding device carried on each joint of the slide, and means for operating the slide.

2. The combination of a support, a jointed slide mounted thereon, a guiding device on each joint of the slide, a link connected with the slide, an elbow-lever in connection with the link, and means for operating the elbow-lever.

3. The combination of a support, having guideways extending longitudinally thereon, a slide mounted in the guideways and comprising two hingedly-connected sections, and a guiding device carried on each section of the slide.

4. The combination of a supporting member, a jointed slide arranged to move on and partly beyond the same, and a guide device attached to each joint of the guide.

In testimony whereof we have signed our names to this specification in the presence of two subscribing witnesses.

WILLIAM P. RUTH.
WILSON H. JONES.

Witnesses:
J. W. COUGHENOUR,
C. H. WALTERS.